United States Patent
Peterson et al.

(10) Patent No.: US 6,804,055 B2
(45) Date of Patent: Oct. 12, 2004

(54) FRESNEL LENS FOR USE WITH REAR PROJECTION DISPLAY

(75) Inventors: Mark David Peterson, Lake Oswego, OR (US); Jeffrey Alan Gohman, Hillsboro, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 10/640,156

(22) Filed: Aug. 12, 2003

(65) Prior Publication Data

US 2004/0047037 A1 Mar. 11, 2004

Related U.S. Application Data

(62) Division of application No. 10/222,083, filed on Aug. 16, 2002.

(51) Int. Cl.[7] ............................................. G03B 21/60
(52) U.S. Cl. ...................... 359/457; 359/454; 359/459
(58) Field of Search ................................. 359/454, 456, 359/457, 459

(56) References Cited

U.S. PATENT DOCUMENTS

| | | | |
|---|---|---|---|
| 4,674,836 A | 6/1987 | Yata et al. .................... 359/457 |
| 4,729,631 A | 3/1988 | Takahashi et al. .......... 359/456 |
| 4,880,292 A * | 11/1989 | Kageyama et al. ......... 359/457 |
| 4,936,657 A * | 6/1990 | Tejima et al. .................. 349/7 |
| RE33,795 E * | 1/1992 | Ogino .......................... 353/74 |
| 5,100,222 A | 3/1992 | Minoura et al. ............ 359/455 |
| 5,302,983 A | 4/1994 | Sato et al. ..................... 353/69 |
| 5,422,691 A | 6/1995 | Ninomiya et al. ............ 353/69 |
| 5,442,413 A | 8/1995 | Tejima et al. .................. 353/69 |
| 5,489,940 A | 2/1996 | Richardson et al. ........ 348/315 |
| 5,495,306 A | 2/1996 | Shibazaki ..................... 353/69 |
| 5,710,668 A | 1/1998 | Gohman et al. ............. 359/634 |
| 5,716,118 A | 2/1998 | Sato et al. ..................... 353/98 |
| 5,724,195 A | 3/1998 | Enomoto et al. ........... 359/752 |
| 5,760,973 A | 6/1998 | Kawamura ................... 359/753 |
| 5,796,528 A | 8/1998 | Mihara ........................ 359/753 |
| 5,805,359 A | 9/1998 | Yamanashi ................... 359/753 |
| 5,820,240 A | 10/1998 | Ohzawa ......................... 353/70 |
| 5,833,339 A | 11/1998 | Sarayeddine ................. 353/20 |
| 5,870,234 A | 2/1999 | Ebbesmeier nee Schitthof ..................... 359/752 |
| 5,923,479 A | 7/1999 | Nagata ......................... 359/740 |
| 5,978,051 A | 11/1999 | Gohman et al. ............. 348/766 |
| 5,999,332 A | 12/1999 | Ohno .......................... 359/692 |
| 6,016,229 A | 1/2000 | Suzuki ......................... 359/784 |
| 6,018,425 A | 1/2000 | Nakabayashi et al. ....... 359/753 |
| 6,038,085 A | 3/2000 | Nakazawa .................... 359/753 |
| 6,046,859 A * | 4/2000 | Raj ............................. 359/649 |
| 6,052,226 A * | 4/2000 | Takahashi .................... 359/457 |
| 6,053,615 A | 4/2000 | Peterson et al. ............... 353/20 |
| 6,081,380 A | 6/2000 | Ohshima et al. ............. 359/599 |
| 6,088,172 A | 7/2000 | Sato ............................ 359/770 |
| 6,111,701 A | 8/2000 | Brown ......................... 359/637 |
| 6,123,425 A | 9/2000 | Ohzawa ......................... 353/69 |
| 6,137,638 A | 10/2000 | Yamagishi et al. .......... 359/682 |
| 6,147,812 A | 11/2000 | Narimatsu et al. ........... 359/691 |
| 6,201,647 B1 | 3/2001 | Ohzawa ......................... 359/631 |
| 6,236,511 B1 | 5/2001 | Brown ......................... 359/634 |
| 6,273,338 B1 * | 8/2001 | White ...................... 235/462.42 |
| 6,301,058 B2 | 10/2001 | Nagahara ..................... 359/650 |
| 6,353,509 B1 | 3/2002 | Nakazawa .................... 359/761 |
| 6,366,400 B1 | 4/2002 | Ohzawa ......................... 359/434 |
| 6,384,987 B1 | 5/2002 | Sensui .......................... 359/753 |
| 6,406,150 B1 | 6/2002 | Burstyn ......................... 353/69 |

(List continued on next page.)

*Primary Examiner*—Rodney Fuller
*Assistant Examiner*—Magda Cruz

(57) ABSTRACT

The ultra-thin rear projection display device described herein includes a wide angle lens system and one or more planar mirrors that are parallel to a screen on which an image is to be displayed. In one embodiment, the screen that has multiple groove angles to provide better illumination than screens with a single groove angle.

25 Claims, 12 Drawing Sheets

U.S. PATENT DOCUMENTS

| | | | |
|---|---|---|---|
| 6,407,859 B1 * | 6/2002 | Hennen et al. | 359/454 |
| 6,407,860 B1 * | 6/2002 | Funazaki et al. | 359/457 |
| 6,419,365 B1 | 7/2002 | Potekev et al. | 353/98 |
| 6,513,935 B2 | 2/2003 | Ogawa | 353/37 |
| 6,561,649 B1 | 5/2003 | Burstyn | 353/8 |
| 2002/0044263 A1 | 4/2002 | Takeuchi | 353/69 |
| 2003/0025885 A1 | 2/2003 | Cotton et al. | 353/69 |
| 2003/0231261 A1 | 12/2003 | Bassi et al. | 348/745 |
| 2004/0001254 A1 | 1/2004 | Shimizu | 359/449 |

* cited by examiner

FRESNEL LENS FOR USE WITH REAR PROJECTION DISPLAY

The present U.S. patent application is a divisional of, and claims the benefit of priority under 35 U.S.C § 120 to, U.S. patent application Ser. No. 10/222,083, filed Aug. 16, 2002 and entitled "REAR PROJECTION DISPLAY."

RELATED APPLICATIONS

The present U.S. patent application is related to U.S. patent application Ser. No. 10/122,050, entitled "WIDE ANGLE LENS SYSTEM WITH INTERMEDIATE IMAGE" filed Aug. 16, 2002.

FIELD

The invention relates to display devices. More specifically, the invention relates to a thin rear projection display device.

BACKGROUND

In order to provide a television with a screen size greater than approximately 40 inches a display device other than a direct view cathode ray tube (CRT) is typically used. As the screen size of a CRT increases, so too does the depth. It is generally accepted that for screen sizes greater than 40 inches direct view CRTs are no longer practical. Two alternatives exist for large screen (>40 inch screen size) displays: projection displays and plasma displays.

Current plasma displays are much more expensive than projection displays. Plasma displays are generally thin enough to mount on a wall, but can be heavy enough that mounting can be difficult. For example, current 42 inch plasma displays can weigh 80 pounds or more and 60 inch plasma displays can weigh 150 pounds or more. One advantage of plasma displays over current projection displays is that plasma displays are typically much thinner than current projection displays having the same screen size.

Projection displays, specifically rear projection displays, are typically more cost-effective then plasma displays. Projection displays may also consume too much space in a room to provide a practical solution for large screen needs. For example, typical 60 inch rear projection displays are 24 inches thick and can weigh 200 to 300 pounds.

FIG. 1 illustrates a prior art rear projection display device. In general, display device 100 includes optical engine 140, projection lens 130, back plate mirror 120 and screen 110. Optical engine 140 generates an image to be projected on screen 110. projection lens 130 projects the image from optical engine 140 on to back plate mirror 120, which reflects the image to screen 110. The size of display device 100 is proportional to the size of the image to be displayed on screen 110. Thus, for large screen sizes (e.g., >60 inches), the overall size of display device 100 can be very large.

Thin rear projection display devices have been developed that are less than 12 inches thick. However, these thinner rear projection display devices typically rely on an aspherical mirror, which is difficult to manufacture and difficult to align. The difficulties associated with the aspherical mirror results in current thin rear projection displays being expensive, which restricts the availability of rear projection displays in desirable packages.

FIG. 2 illustrates a prior art thin rear projection display device with an aspherical mirror. An image from optical engine 260 is projected on reflective mirror 240 by projection lens 250. Reflective mirror 240 reflects the image to aspherical mirror 230, which magnifies the projected image and extends the field ray angle. Aspherical mirror 230 reflects the image to back plate mirror 220, which then reflects the image to screen 210. While rear projection display device 200 provides a thinner package for the same size screen as compared to display device 100 of FIG. 1, the manufacturing and alignment issues associated with use of aspherical mirror 230 greatly increases the cost of display device 200.

Another shortcoming of display device 200 is the angle of optical engine 260 with respect to mirrors 220, 230 and 240 and to screen 210. Without compensation, the angle of optical engine 260 results in a trapezoidal, or keystone, shaped image. The compensation associated with the angle to provide a square image further increases the cost and complexity of display device 200.

SUMMARY

A display device includes a screen, a wide angle lens system that projects an image using a portion of a lens field of the wide angle lens system, and a substantially planar back plate mirror to reflect the image to the screen. The back plate mirror is substantially perpendicular to the optic axis of the wide angle lens system and substantially parallel to the screen. In one embodiment, the display device also includes a substantially planar intermediate mirror that reflects the image projected by the wide angle lens system to the back plate mirror. The intermediate mirror being parallel to the back plate mirror. In one embodiment, the screen has a first region and a second region, the first region having a first groove angle and the second region having a second groove angle.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

An ultra-thin rear projection display system is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

The ultra-thin rear projection display device described herein includes a wide angle lens system and one or more planar mirrors that are parallel to a screen on which an image is to be displayed. In one embodiment, the screen that has multiple groove angles to provide better illumination than screens with a single groove angle.

As described in greater detail below, the screen can be a Fresnel lens having one or more groove angles. However, many other objects can operate as a screen for purposes of displaying an image. In general, any object that diffuses light can be used as a screen. For example, a wall, water or fog can be used as a screen.

Figure 1:
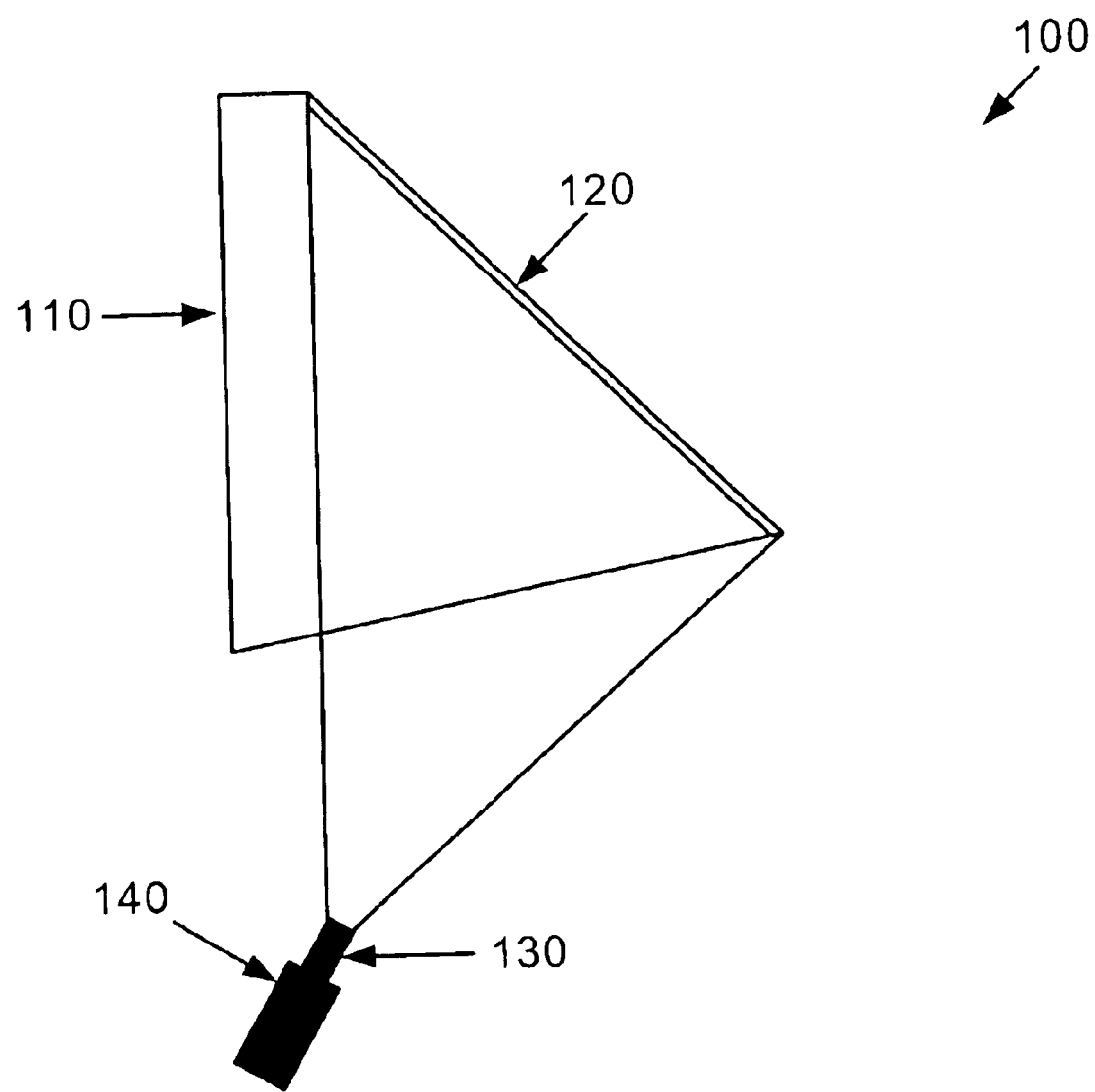
FIG. 1 illustrates a prior art rear projection display device.
Figure 2:
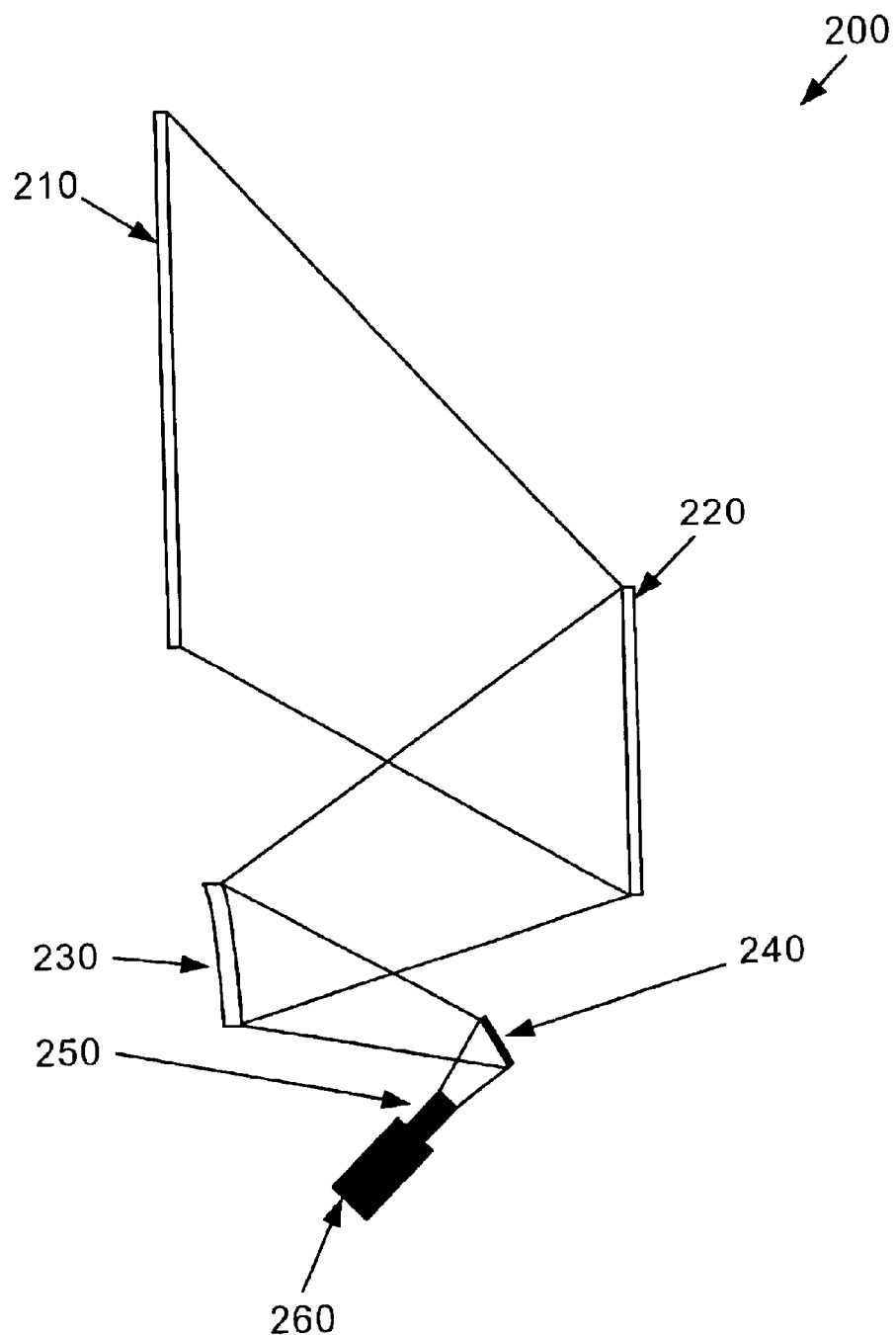
FIG. 2 illustrates a prior art thin rear projection display device with an aspherical mirror.
Figure 3:
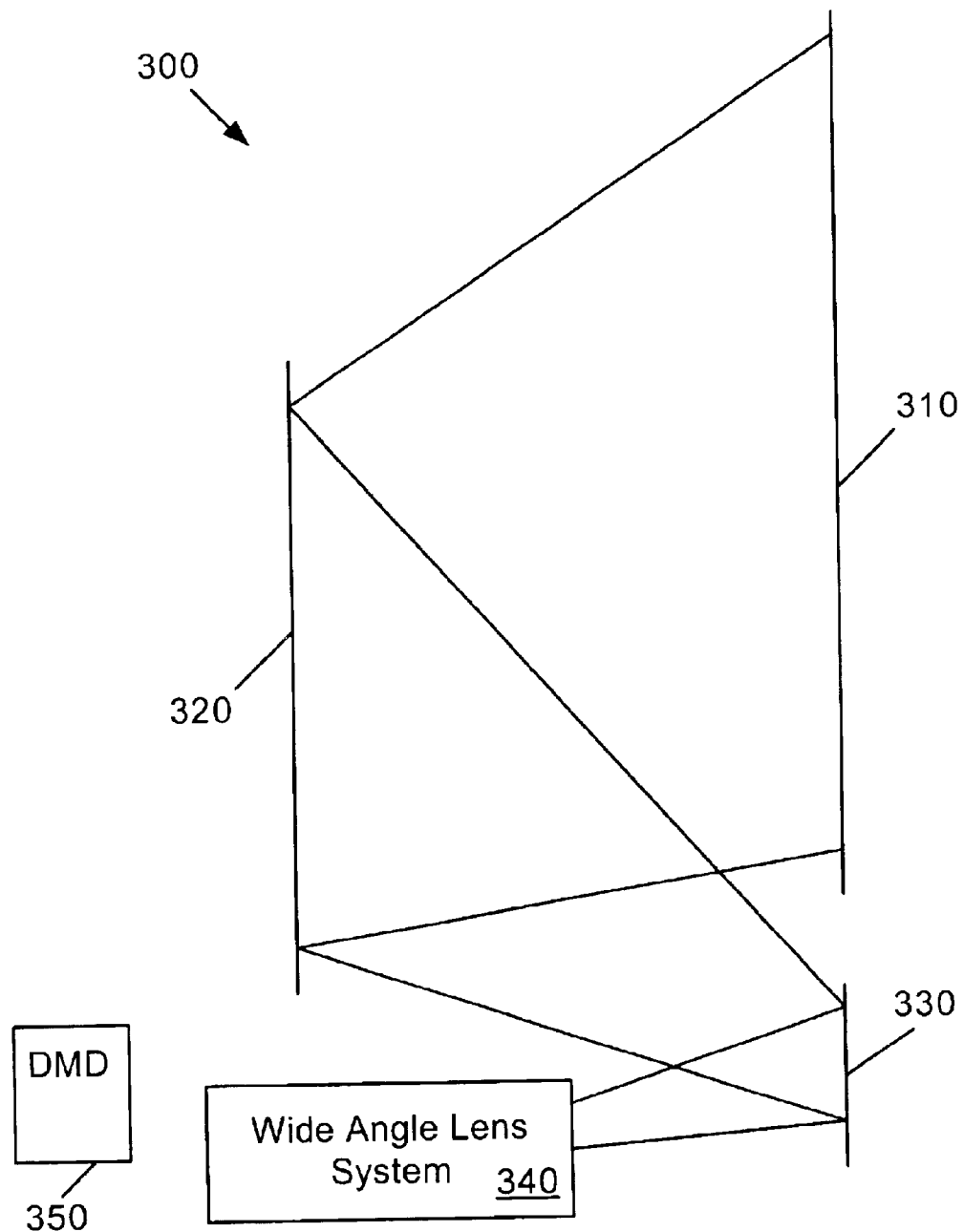
FIG. 3 illustrates one embodiment of an ultra-thin rear projection display device with planar mirrors parallel to a screen.

FIG. 3 illustrates one embodiment of an ultra-thin rear projection display device with planar mirrors parallel to a screen. As described in greater detail below, use of planar mirrors parallel to the screen as well as a wide angle projection lens having an optic axis that is perpendicular to the mirrors and the screen allows the ultra-thin rear projection display device to be thinner and simpler than prior art rear projection display devices. For example, an ultra-thin rear projection display device as described herein that is less than 7 inches thick can provide a 60 inch image.

In one embodiment, ultra-thin rear projection display device 300 includes screen 310, back plate mirror 320, intermediate mirror 330, lens system 340 and digital micromirror device (DMD) 350. Other components, for example, image generating components are not illustrated for reasons of simplicity of description. An image can be provided to DMD 350 in any manner known in the art. DMD 350 selectively reflects light from a light source (not shown in FIG. 3) to lens system 340. Any type of display device known in the art can be used in display device 300. Other types of devices (e.g., microelectromechanical systems (MEMS), grating light valve (GLV), liquid crystal display (LCD), liquid crystal on silicon (LCOS)) can be used to provide an image to lens system 340. In one embodiment, the mirrors are substantially parallel to the screen, which implies an alignment error of +/−10°. In one embodiment, the optic axis of the wide angle lens system is substantially perpendicular to the screen, which also implies an alignment error of +/−10°

In one embodiment, DMD 350 is offset from the optic axis of lens system 340 such that only a portion (e.g., 50%, 60%, 40%) of the available lens field is used. By offsetting DMD 350 with respect to the optic axis of lens system 340, the image from DMD 350 is projected by lens system 340 in the upper portion of the lens field to intermediate mirror 330. Alternatively, a lower portion of the lens field can be used to project an image to intermediate mirror 330. In such an embodiment, lens system 340 would be above intermediate mirror 330, which would be above back plate mirror 320.

In order to project an image as described, lens system 340 is a very wide angle lens system. In one embodiment, lens system 340 has a field angle of 152° or more; however, other lenses can be used. In general, the wider the angle of lens system 340, the thinner display device 300 can be made. Description of a suitable wide angle lens system is described in the above-referenced patent application, which is incorporated by reference.

Intermediate mirror 330 reflects the image to back plate mirror 320, which reflects the image to screen 310. In one embodiment, screen 310 is a Fresnel lens. Back plate mirror 320 is also a planar mirror and is parallel to screen 310 and perpendicular to the optic axis of lens system 340. Because the optic axis of lens system 340 is perpendicular to intermediate mirror 330 and both intermediate mirror 330 and back plate mirror 320 are planar and parallel to screen 310, the distortion caused by angled lenses and aspherical mirrors is absent in display device 300. This simplifies the design of display device 300 and reduces the cost and complexity of manufacturing.

Figure 4:
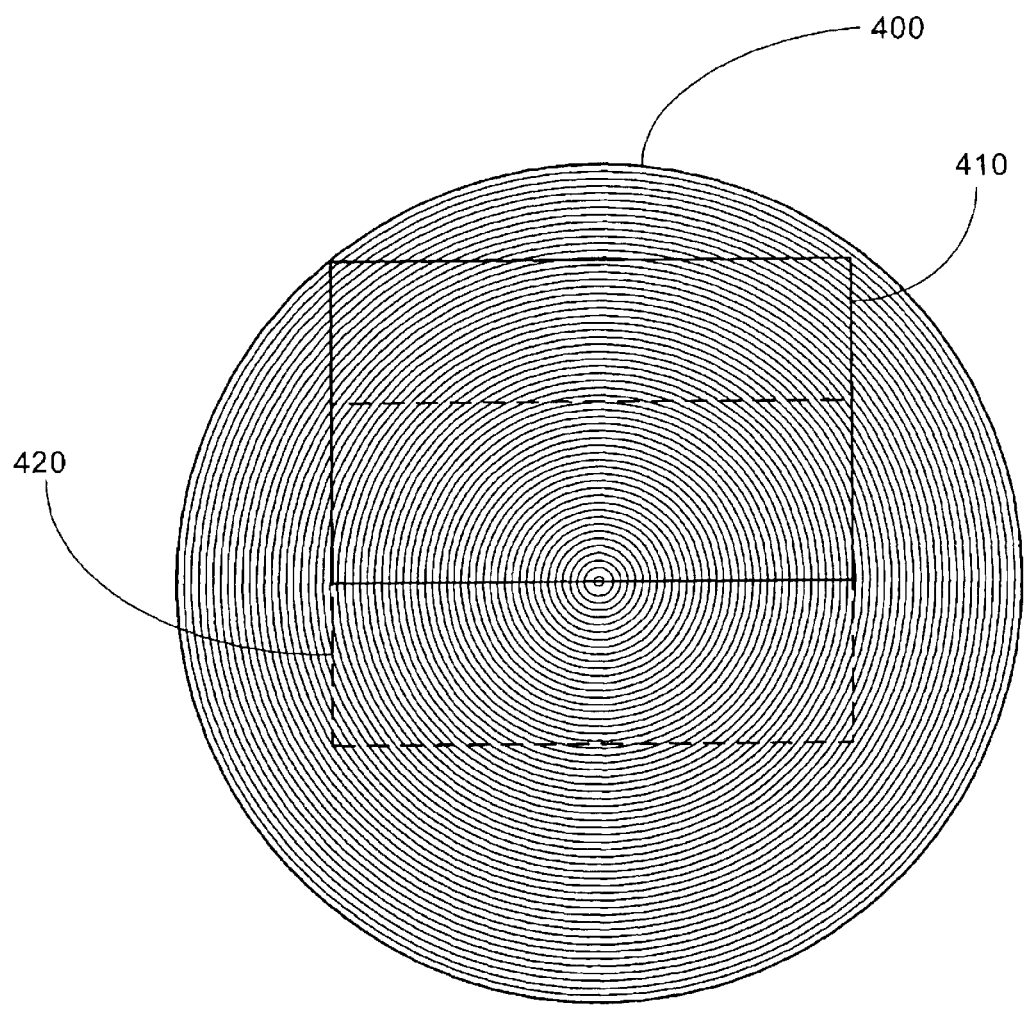
FIG. 4 illustrates a Fresnel lens with outlines of sections to be used for rear projection screens.

FIG. 4 illustrates a Fresnel lens with outlines of sections to be used for rear projection screens. FIG. 4 provides a conceptual illustration of the sections of a Fresnel lens that can be used for various rear projection display devices. The Fresnel lens can be described with two angles. The face angle is defined as the angle of the surface of each individual groove through which light passes as it enters, or in the case of some refractive designs exits the Fresnel lens relative to the optic axis of the lens. The groove angle is the angle formed between the input face and the reflection face, or in the case of a refractive lens between the optical face of the groove and the non-optical face.

In one embodiment, Fresnel lens 400 can have many concentric grooves having one or more predetermined groove angles. Techniques for manufacturing and using Fresnel lenses having a single groove angle are known in the art. In a rear projection display device in which the full lens field of the projection lens system is used, a center portion 420 of Fresnel lens 400 is used for the lens of the display device.

Dashed rectangle 420 provides an indication of a screen from the center portion of Fresnel lens 400. The size and shape of the portion of the lens to be used corresponds to the size and shape of the screen of the display device. For traditional rear projection displays, the center of section 420 to be used for a screen is the center of Fresnel lens 420.

When using an offset DMD (or other device) so that only a portion of the projection lens field is used, the section of Fresnel lens 400 used for a screen is correspondingly offset from the center of Fresnel lens 400. For example, if the top half of the projection lens field is used, the bottom edge of screen portion 410 passes through the center of Fresnel lens 400.

Figure 5:
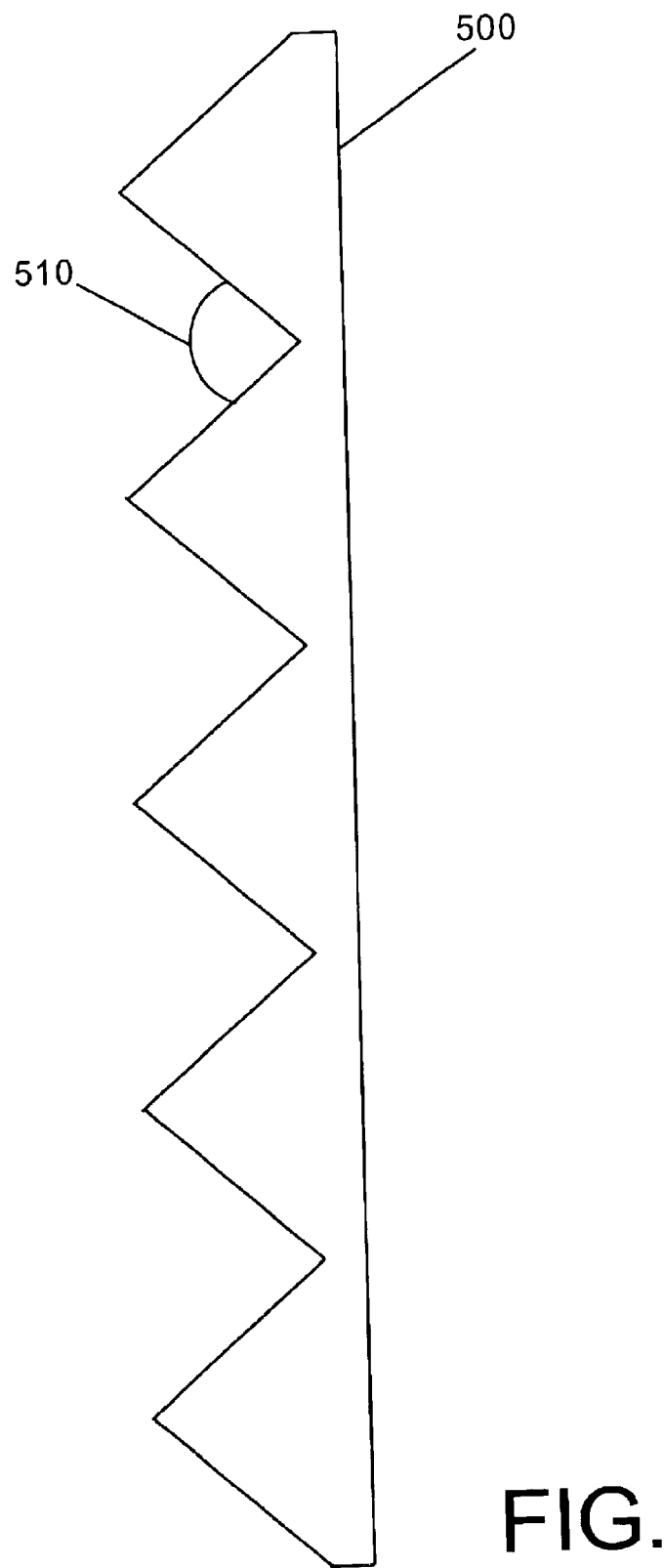
FIG. 5 illustrates a cross-sectional profile view of a Fresnel lens having a groove angle of 39°.

FIG. 5 illustrates a cross-sectional profile view of a Fresnel lens 500 having a groove angle 510 of 39°. The lens of FIG. 5 can be used with, for example, the display system of FIG. 3. When used with a display system as illustrated in FIG. 3 with an offset as described with respect to FIG. 4, the groove angle of 39° provides a balance between diamond cutter structural integrity and lens performance.

As the groove angle increases the image projected to the bottom center of lens 500 becomes dark because rays pass through the lens without being reflected. As the groove angle decreases, the image projected to the top corners of lens 500 become dark because reflected rays are directed down and away from the viewer. Also, as the groove angle decreases, the tool used to manufacture lens 500 can become too weak to work effectively.

Figure 6A:
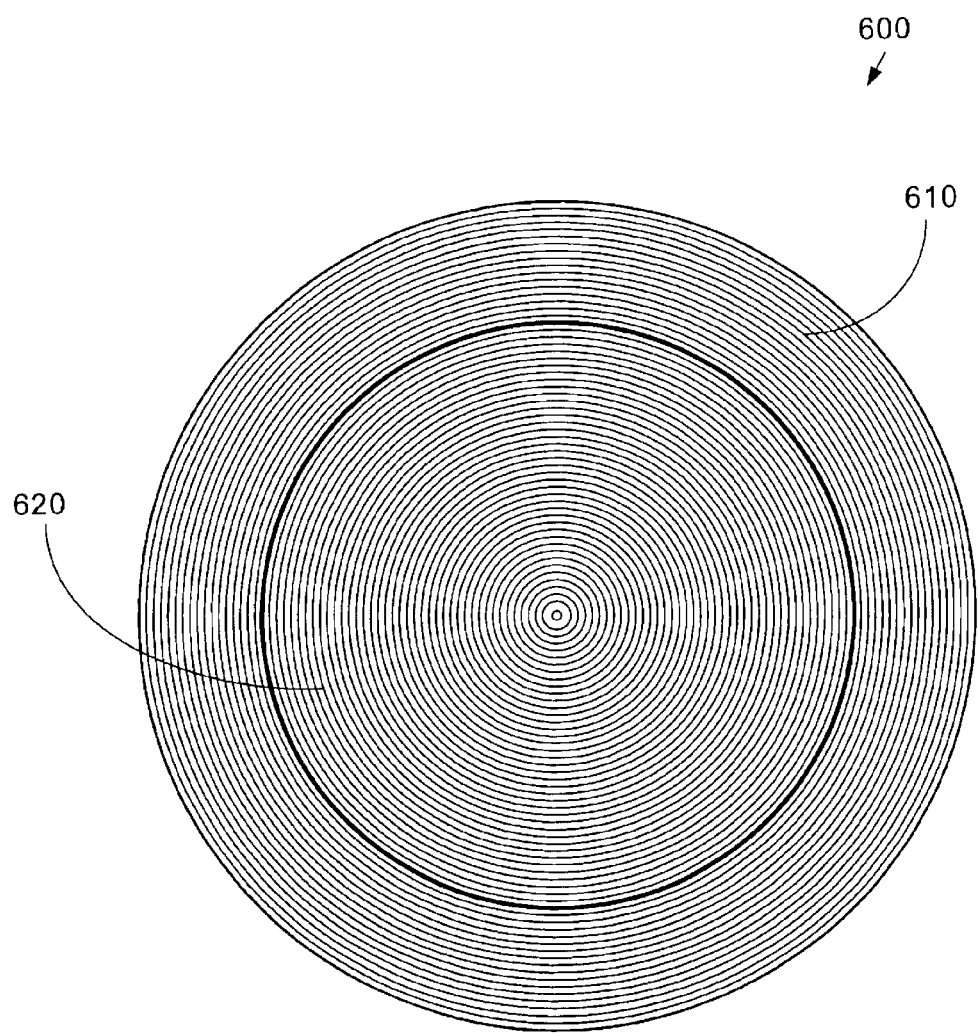
FIG. 6a illustrates a front view of a Fresnel lens having two zones each having a different groove angle.

FIG. 6a illustrates a front view of a Fresnel lens having two zones each having a different groove angle. The embodiment of FIG. 6a illustrates two zones with two groove angles; however, any number of zones with corresponding groove angles can be used. The groove angle of a lens can vary continuously. Also, while the example of FIG. 6a illustrates circular regions, other shapes can also be used.

In one embodiment, interior region 620 has grooves of approximately 35°; however, other groove angles can also be used. When used for large screens, a Fresnel lens with a single groove angle throughout provides inconsistent illumination. In one embodiment, outer region 610 has grooves of approximately 41°; however, other groove angles can also be used. In alternate embodiments, interior region 620 and outer region 610 can provide any combination of refraction and/or reflection lenses. In one embodiment, the projector side of lens 600 has grooves and the viewer side is planar. In an alternate embodiment, lens 600 has grooves on both sides.

Figure 6B:
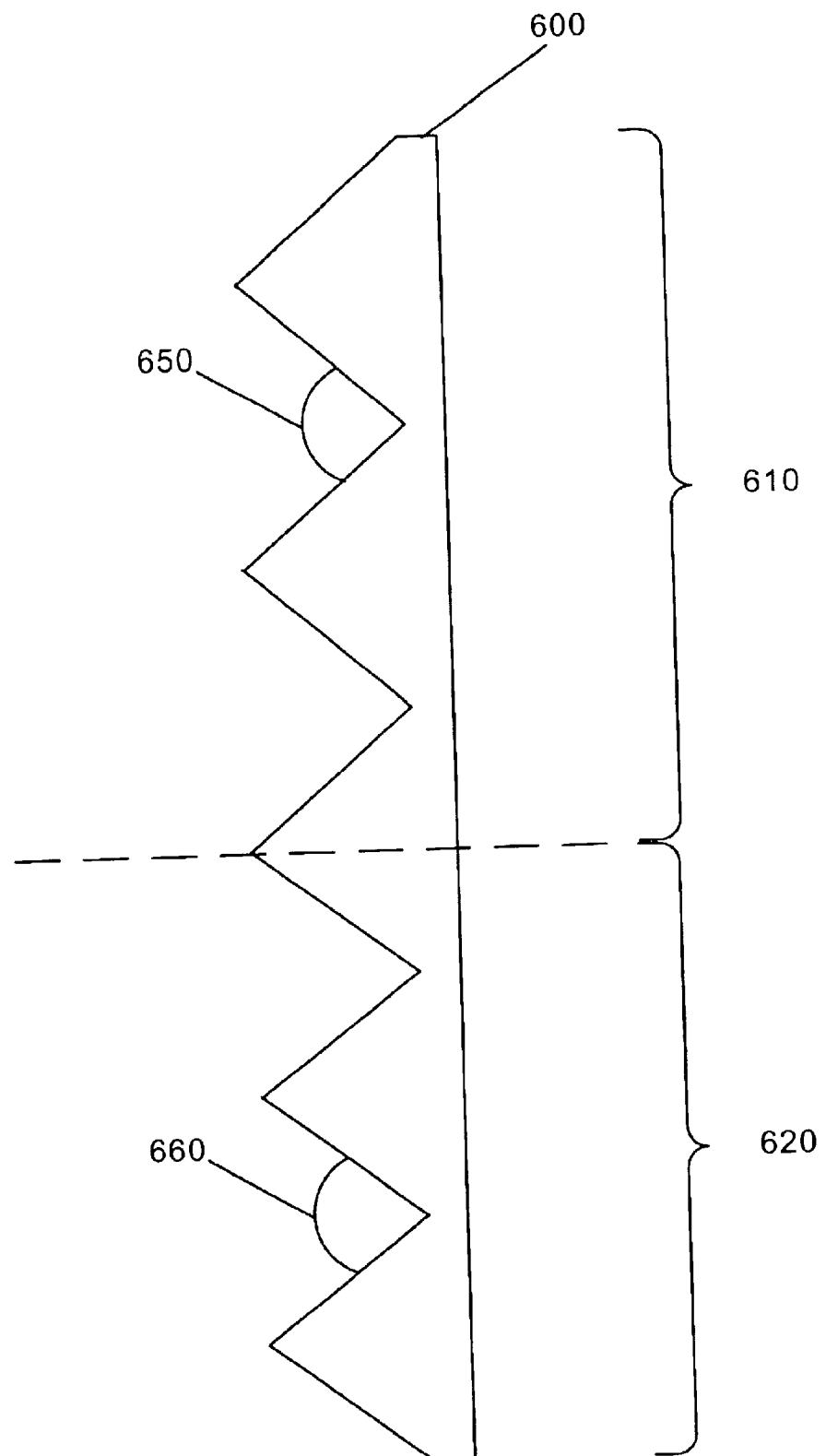
FIG. 6b illustrates a cross-sectional profile view of a two-zone Fresnel lens having a first zone with a groove angle of 35° and a second zone having a groove angle of 41°.

FIG. 6b illustrates a cross-sectional profile view of a two-zone Fresnel lens having a first zone with a groove angle 660 of 35° and a second zone having a groove angle 650 of 4°. The lens FIG. 6b can be used with, for example, the display system of FIG. 3. The lens of FIG. 6b provides improved uniformity as compared to the lens of FIG. 5.

In one embodiment, the grooves of zone 620 provide a refractive lens and the grooves of zone 610 provide a total internal reflection (TIR) lens. The refractive and reflective zones of lens 600 can be on the same side of the lens (e.g., the projector side) or the refractive and reflective zones of lens 600 can be on opposite sides (e.g., reflective on the projector side and refractive on the viewer side). As described in greater detail below, transition regions can be used to reduce or even eliminate image artifacts caused by transitions between zones. For a double-sided lens, two single-sided lenses can be aligned and the planar sides of each lens can be bonded together. Alternatively, one side of the lens can be manufactured as described above and additional grooves can be formed directly on the lens material.

Figure 7:
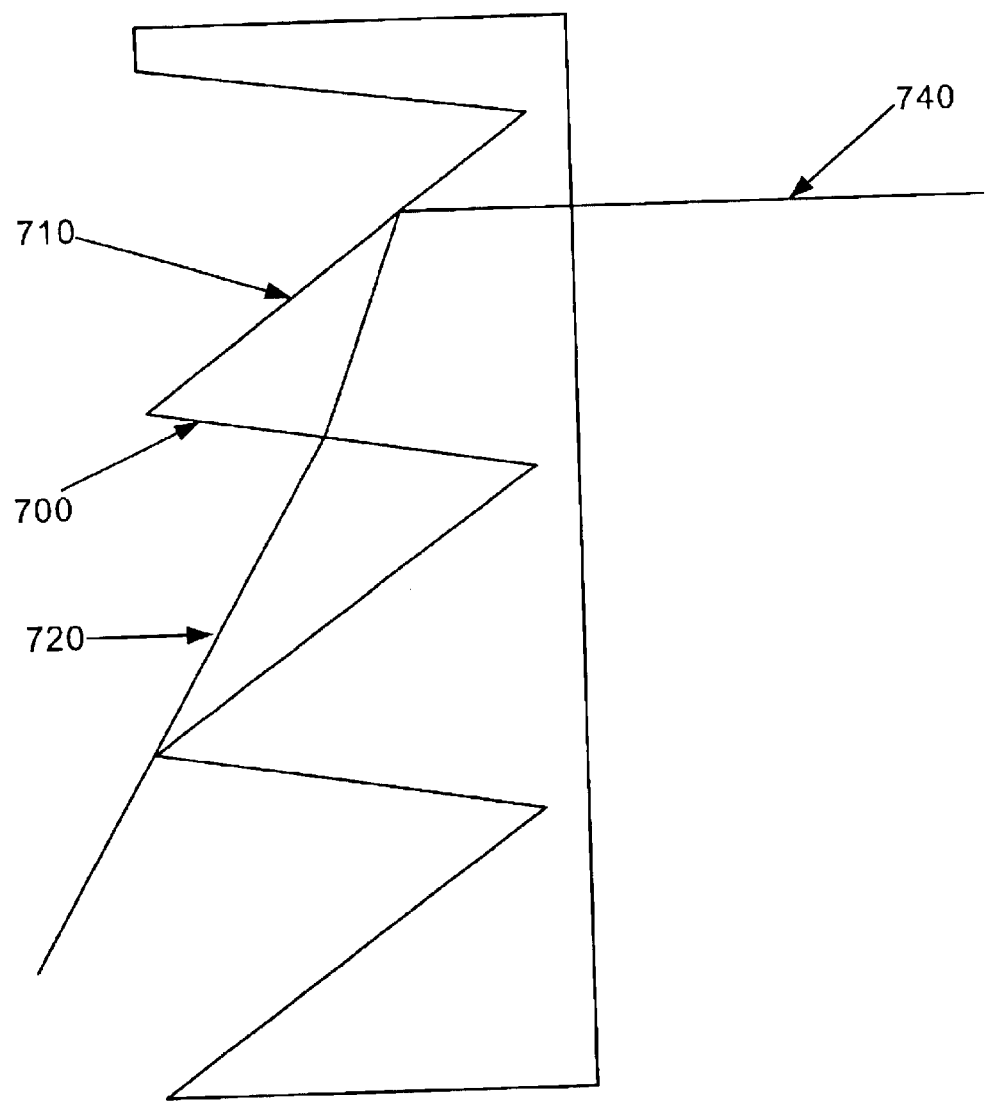
FIG. 7 illustrates an input ray having a 60° input angle with a Fresnel lens having a face angle of 10°.

FIG. 7 illustrates an input ray having a 60° input angle with a Fresnel lens having a face angle of 10°. For steep angles of input light (e.g., greater than about 45°) it is possible to design face angles of the grooves such that all light enters the Fresnel lens and reflects off the reflection face and travels directly toward the viewer. For example, input light 720 passes through groove face 700 and is slightly refracted. Refracted light 730 is reflected by reflection face 710 toward a viewer (not shown in FIG. 7). For most applications, reflected light 740 is directed toward the viewer.

As the angle of the input light decreases, there is an angle at which the refracted light misses reflection face 710. This occurs, for example, at the bottom center of the screen at the grooves closest to the Fresnel center. This light is lost and travels through the Fresnel structure creating either a ghost image or a reduction in contrast. The lost light reduces contrast at the bottom center of the screen area (and possibly everywhere depending on where the mirrors are with respect to the screen).

One technique to reduce ghost rays and improve contrast in these areas is to change the reflection face angle such that, instead of directing light toward the viewer, the lens is designed to collect as much light as possible. As a consequence, the reflected light ray 740 travels downward. This improves the contrast of the displayed image, but the downward light does not get redirected to viewer as well and appears dark.

The face angles can be designed so that light from the edges of the screen, where the input rays are steep, can direct the reflected light toward the center of the lens to improve perceived brightness at the edges of the image.

In one embodiment, all groves are on a projection side of the lens and the viewer side of the lens is planar. In alternate embodiments, the grooves for one zone are on the projection side of the lens and the grooves for another zone are on the viewer side of the lens.

Figure 8:
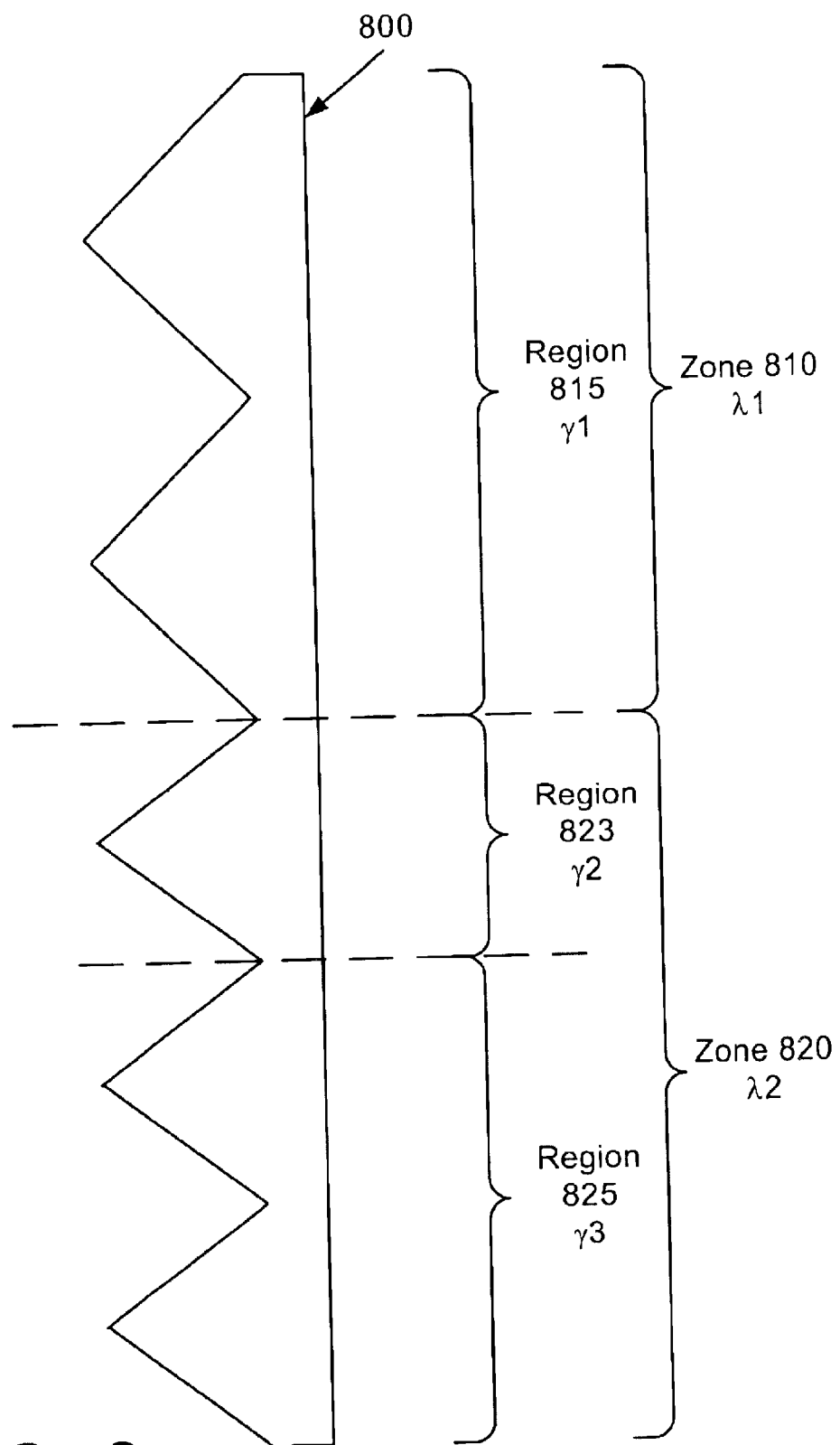
FIG. 8 illustrates a profile cross section view of a Fresnel lens design having two zones with different groove angles and transition regions for the zones.

FIG. 8 illustrates a profile cross section view of a Fresnel lens design having two zones (810 and 820), with zone 810 including region 815 with face angle and ($\delta$1) and zone 820 including regions 823 and 825. The two zones have different groove angles and a transition region 823 for the zones. Lens 800 is illustrated with only a small number of grooves, zones and regions. Region 823 has a face angle $\delta$2 and region 825 have a face angle $\delta$3. This is for simplicity of description. A Fresnel lens can be used that has any number of grooves, zones and/or regions.

As used herein, a "zone" is an area of a Fresnel lens having a particular groove angle (when the groove angle is not continuously variable). A "region" is an area of a Fresnel lens in which the face angle ($\gamma$) is defined by a single equation. A zone can include multiple regions. In one embodiment, one or more transition regions are included at zone boundaries in order to provide a smooth zone transition.

In one embodiment, the equation, F, that defines the face angle, which can be a function of radius, r, for a first region and the equation, G, that defines the face angle for a second region are equal at the region boundary. In other words, $F(r_1)=G(r_1)$ where $r_1$ is the region boundary. Further, the first derivative of the equation that defines the face angle for a region is equal to the first derivative of equation that defines the face angle at the region boundary. In other words, $F'(r_1)=G'(r_1)$ where $r_1$ is the region boundary.

Figure 9:
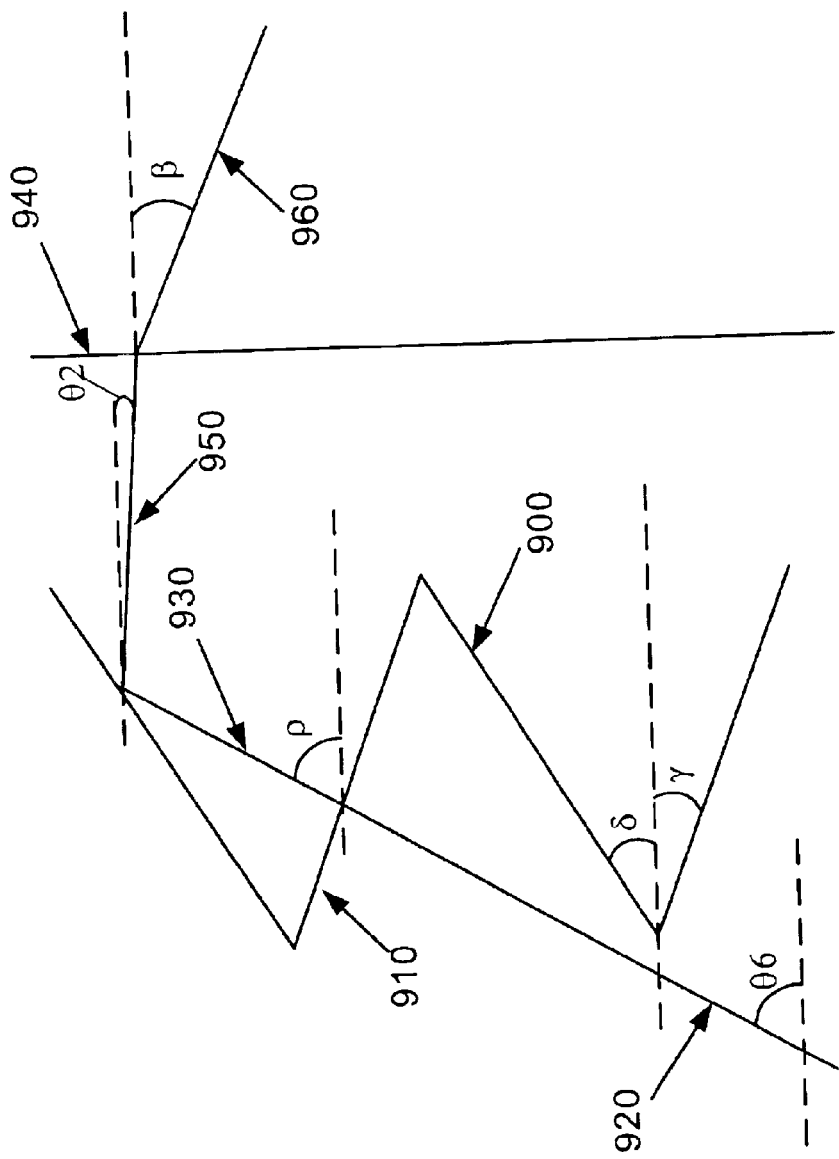
FIG. 9 illustrates a profile cross section view of a Fresnel lens design.

FIG. 9 illustrates a profile cross section view of a Fresnel lens design. In one embodiment, the following equations describe the various angles of the Fresnel lens design. Alternative angle relationships can also be used. In the equations that follow, $\theta 6$ is the input angle, or the angle of input ray 920 from horizontal; $\gamma$ is the face angle, or the angle of refraction face 910 from horizontal; $\delta$ is the reflection face angle, or the angle of refraction face 900 from horizontal; $\rho$ is the refracted ray angle, or the angle of refracted ray 930 from horizontal; $\theta 2$ is the reflected ray angle, or the angle of reflected ray 950 from horizontal; and $\beta$ is the output ray angle, or the angle of output ray 960 exiting rear face 940 from horizontal.

In one embodiment, the following equations are used to determine the angles to be used for various regions. For a fixed peak angle (peak angle k=$\gamma$+$\delta$), the face angle can be calculated to create a Fresnel lens with no ghost rays near the bottom center and the face angles are modified to increase throughput.

For a two region embodiment, the inner region can be a lossless system defined by:

$$F(R, \gamma) := \left[ \frac{\tan(\gamma) \cdot (\tan(\gamma) + 2 \cdot \tan(k - \gamma)) + \tan\left(\frac{\pi}{2} - \gamma - \mathrm{asin}\left(\frac{\cos\left(\mathrm{atan}\left(\frac{R}{fl}\right) + \gamma\right)}{n}\right)\right) \cdot \tan(k - \gamma)}{\tan\left(\frac{\pi}{2} - \gamma - \mathrm{asin}\left(\frac{\cos\left(\mathrm{atan}\left(\frac{R}{fl}\right) + \gamma\right)}{n}\right)\right) - \tan(k - \gamma)} - \frac{R}{fl} \right]$$

where n is the refractive index of the Fresnel lens material, k is the groove angle, R is the radius from the center of the Fresnel lens, and ƒ1 is the focal length of the Fresnel lens. Outer regions are defined by:

$$F2(R, \gamma) := \frac{\pi}{2} - \gamma - \operatorname{asin}\left(\frac{\cos\left(\operatorname{atan}\left(\frac{R}{f1}\right) + \gamma\right)}{n}\right) - 2(k - \gamma) - \theta 2 \quad 5$$

Figure 10:
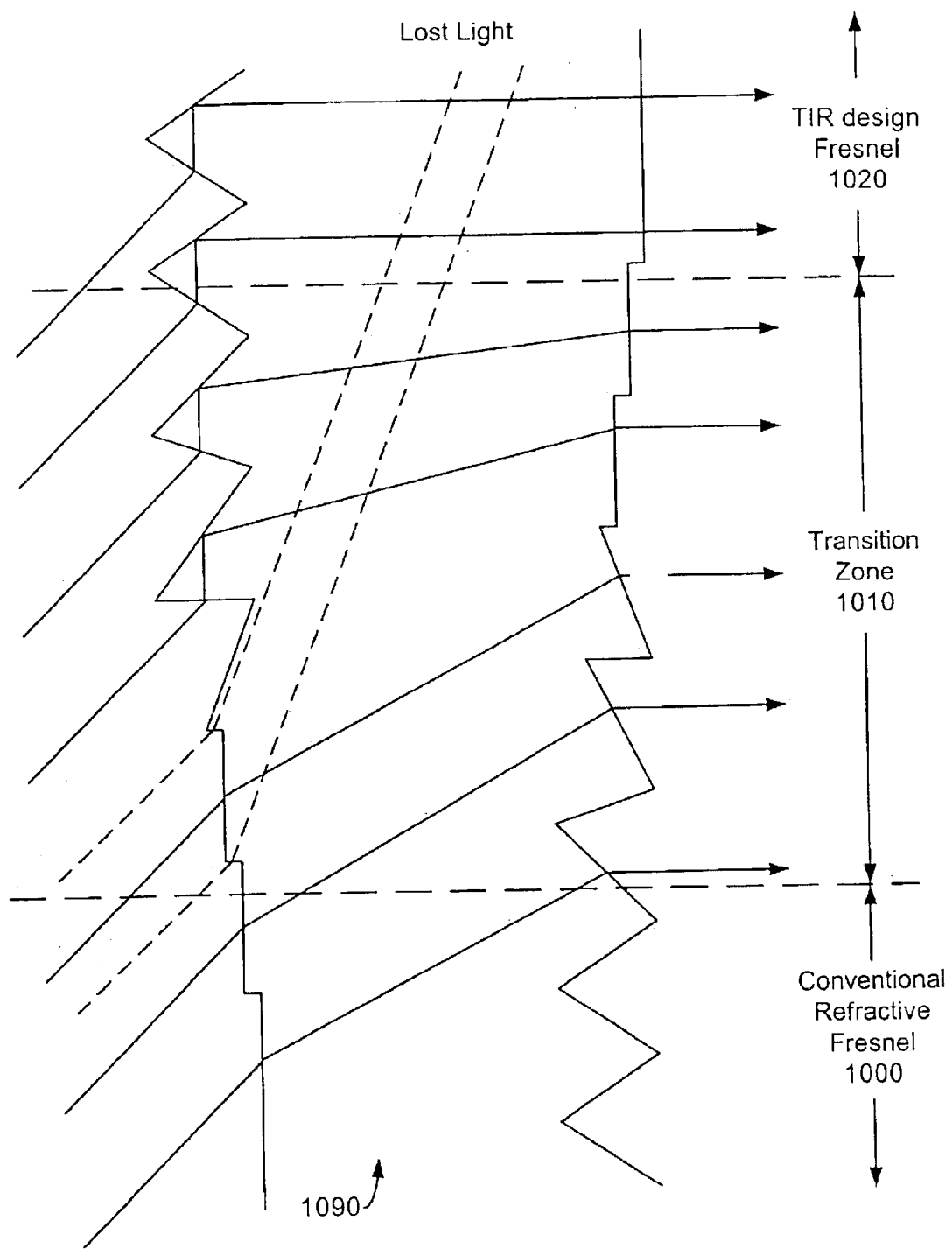
FIG. 10 illustrates one embodiment of a Fresnel lens having two zones on opposite sides of the lens with a transition region for the two zones.

FIG. 10 illustrates one embodiment of a Fresnel lens having two zones on opposite sides of the lens with a transition region for the two zones. Fresnel lens 1090 includes two zones: a refractive zone, a reflective zone, and a transition region. In alternate embodiments, lens 1090 can have one or more zones on a single side.

In one embodiment, Fresnel lens 1090 includes an inner zone that is a conventional refractive Fresnel lens design 1000. The inner zone includes the center of lens 1090 extending outward until the outer zone becomes more efficient than the inner zone. Fresnel lens 1090 further includes an outer zone that is a total internal reflection Fresnel design 1020. The outer zone directs more light toward the viewer than if the refractive design of the inner zone were to extend to the edge of the lens.

In order to reduce, or even eliminate, discontinuities between the refractive and the reflective portions of lens 1090, transition region 1010 is included. In one embodiment, in transition region 1010, the light rays internal to Fresnel lens 1090 change gradually from the upward angle of the refractive design to the horizontal angle of the reflective design. The gradual change reduces image discontinuities due to overlapping rays.

Figure 11:
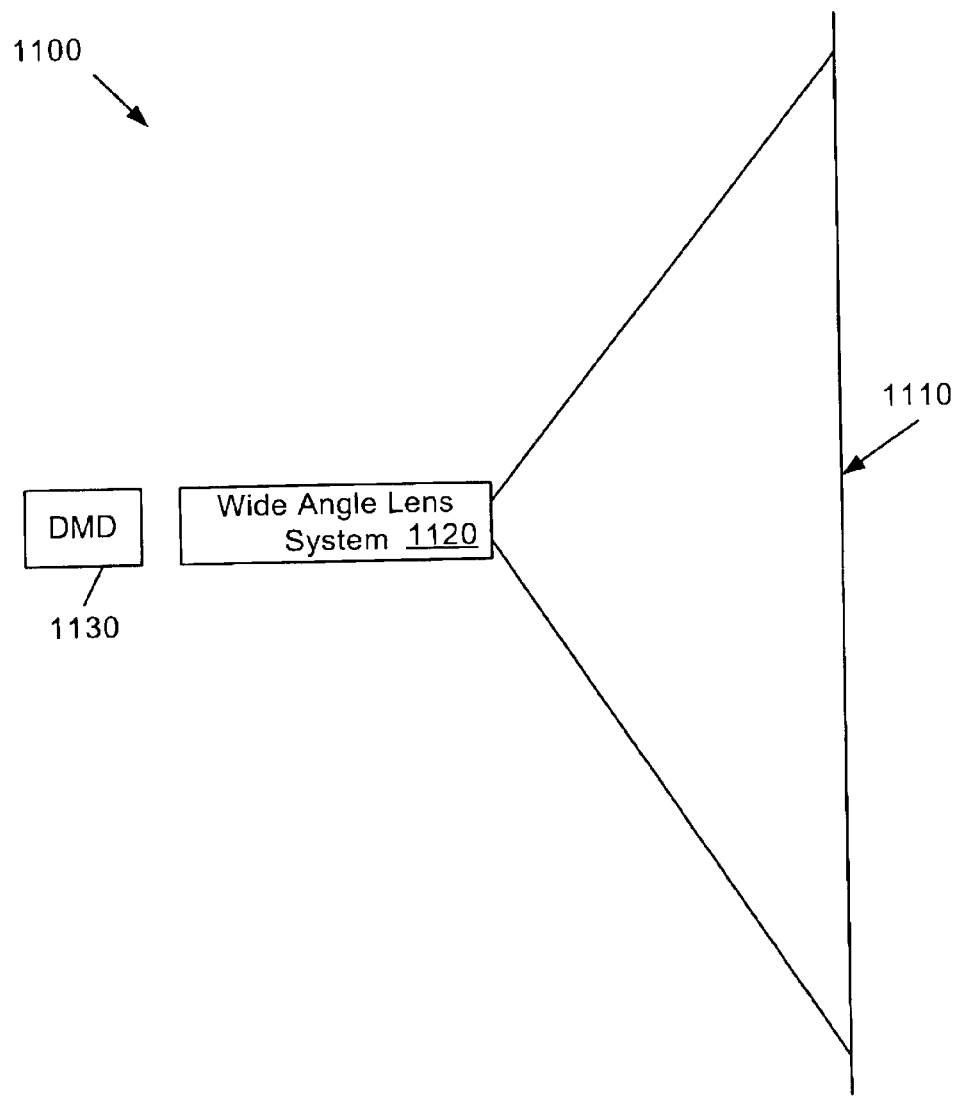
FIG. 11 illustrates one embodiment of a rear projection display device having a wide angle lens.

FIG. 11 illustrates one embodiment of a rear projection display device having a wide angle lens. Display device 1100 includes screen 1110, wide angle lens system 1120 and DMD 1130. In one embodiment, screen 1110 is a Fresnel lens as described in greater detail above.

An image is generated a provided by optical engine components (not shown in FIG. 11) that are known in the art and directed to wide angle lens system 1120 via DMD 1130. In alternate embodiments, DMD 1130 can be replaced by other components, for example, microelectromechanical systems (MEMS), grating light valves (GLV), liquid crystal display (LCD), liquid crystal on silicon (LCOS), etc. In one embodiment, the optic axis of DMD 1130 is aligned with the optic axis of wide angle lens system 1120 so that the full lens field is used to project the image to screen 1110. In alternate embodiments, the optic axis of DMD 130 can be offset from the optic axis of wide angle lens system 1120. Use of a Fresnel lens as described above provides a thinner system with better brightness uniformity.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A Fresnel lens having a center location and an input ray side and an exit ray side, comprising:
   a single set of concentric grooves, said single set comprising:
   a first zone on the input ray side having a first groove angle, for circular grooves about a groove center location, within the first zone; and
   a second zone on the input ray side having a second groove angle, for circular grooves about said groove center location, within the second zone, with said groove center location offset from the lens center location.

2. The Fresnel lens of claim 1 wherein the grooves of the first zone comprise multiple concentric grooves.

3. The Fresnel lens of claim 1 wherein the grooves of the first zone comprise one or more spiraled grooves.

4. The Fresnel lens of claim 1 wherein the grooves of the second zone comprise multiple concentric grooves.

5. The Fresnel lens of claim 1 wherein the grooves of the second zone comprise one or more spiraled grooves.

6. The Fresnel lens of claim 1 wherein the first zone surrounds the second zone.

7. The Fresnel lens of claim 6 wherein the first groove angle is less than the second groove angle.

8. The Fresnel lens of claim 6 wherein the first groove angle is greater than the second groove angle.

9. The Fresnel lens of claim 1 wherein the first zone partially surrounds the second zone.

10. The Fresnel lens of claim 9 wherein the first groove angle is less than the second groove angle.

11. The Fresnel lens of claim 9 wherein the first groove angle is greater than the second groove angle.

12. The Fresnel lens of claim 1 wherein the first groove angle is approximately 35° and the second groove angle is approximately 41°.

13. The Fresnel lens of claim 1 wherein the grooves of the second zone provide total internal reflection.

14. The Fresnel of claim 1 wherein the lens that directs light from an upper corner downward and directs light from a central region substantially perpendicular to the lens.

15. The Fresnel lens of claim 1 wherein, at the border between the first zone and the second zone, a rate of change of face angles in the first zone is substantially equal to a rate of change of face angles in the second zone.

16. The Fresnel lens of claim 2 wherein, at the border between the first zone and the second zone, a rate of change of face angles in the first zone is substantially equal to a rate of change of face angles in the second zone.

17. A display device having the Fresnel lens of claim 1.

18. A Fresnel lens having a center location, comprising:
   a first reflective zone comprising:
   a first region having a first groove angle, for circular grooves about a groove center location, within the first region; and
   a second region having a second groove angle, for circular grooves about said groove center location, within the second zone, with said groove center location offset from the lens center location and the first region and the second region on a first side of the lens; and
   a second refractive zone.

19. The Fresnel lens of claim 18 wherein said first region partially surrounds said second region, said first groove angle is less than said second groove angle.

20. The Fresnel of claim 19 wherein the lens directs light from an upper corner downward and directs light from said groove center location substantially perpendicular to the lens.

21. A Fresnel lens having a center location and an input ray side and an exit ray side, comprising:
   a single set of concentric grooves, said single set comprising:

a first zone on the input ray side having a first set of grooves with a first groove angle, said first set of grooves being circular grooves about a groove center location, within the first zone; and a second zone on the input ray side having second set of grooves with a second groove angle, said second set of grooves being circular grooves about said groove center location, within the second zone, with said groove center location offset from the lens center location, and with said first zone partially surrounding said second zone and said first groove angle less than said second groove angle; and where grooves at one edge of the lens have a different groove angle than grooves at an opposite edge of the lens.

22. The Fresnel lens of claim 21 where said one edge is a top edge of the lens and said opposite edge is a bottom edge of the lens.

23. A Fresnel lens having a center location and an input ray side and an exit ray side, comprising:

a single set of concentric grooves, said single set comprising:

a first zone on the input ray side having at least two grooves with a common first groove angle, for circular grooves about a groove center location, within the first zone; and a second zone on the input ray side having at least two grooves with a common second groove angle, for circular grooves about said groove center location, within the second zone, with said groove center location offset from the lens center location.

24. The Fresnel lens of claim 23 where grooves at one edge of the lens have a different groove angle than grooves at an opposite edge of the lens.

25. The Fresnel lens of claim 24 where said one edge is a top edge of the lens and said opposite edge is a bottom edge of the lens.

* * * * *